Jan. 15, 1957   R. B. STEELE ET AL   2,777,973
METHOD AND APPARATUS FOR ELECTRIC ARC WELDING
Filed March 16, 1955   2 Sheets-Sheet 1

INVENTORS
RICHARD B. STEELE
RAWLINS E. PURKHISER
BY NELSON E. ANDERSON
AGENT

INVENTORS
RICHARD B. STEELE
RAWLINS E. PURKHISER
BY NELSON E. ANDERSON
AGENT

United States Patent Office 2,777,973
Patented Jan. 15, 1957

2,777,973

METHOD AND APPARATUS FOR ELECTRIC ARC WELDING

Richard B. Steele, New Providence, Rawlins E. Purkhiser, Springfield, and Nelson E. Anderson, Berkeley Heights, N. J., assignors to Air Reduction Company, Incorporated, New York, N. Y., a corporation of New York Application March 16, 1955, Serial No. 494,594

9 Claims. (Cl. 315—171)

This invention relates to power sources for direct current arc welding and more particularly it relates to rectifier type direct current arc welding power sources of a type capable of being energized from a single phase alternating current supply.

Direct current arc welding machines now used in commercial practice fall in two general categories—the motor or engine driven rotating direct current generator and the transformer-rectifier welder. Machines of both these types, while completely satisfactory in their operation and in widespread use, have one or more of the disadvantages of being heavy, expensive, and requiring a high voltage polyphase power source for their operation. In many instances the cost of a welding machine and its installation are completely out-of-line with the cost of the other equipment required and with the value of the product to be welded. This is particularly true for light duty welding with an inert gas shield and tungsten electrode for home, farm, and small shop use.

An object of the present invention is to provide a rectifier type direct current arc welder capable of stable arc operation from a single phase alternating current supply.

Another object is to provide methods and apparatus for producing maximum arc stability in a rectifier type direct current arc welder having low single phase transformer primary current.

Another object is to provide methods and apparatus for minimizing power losses within a rectifier type direct current arc welder.

These and other objects and advantages of the invention will be pointed out or will become apparent from the following detailed description.

According to the present invention the total welding current comprises the combined outputs of a main welding circuit and an auxiliary "keep-alive" circuit. The main welding circuit comprises a full wave rectifier circuit which, in a preferred form of the invention, is of relatively high current and low open circuit voltage. The auxiliary keep-alive circuit comprises a full wave rectifier circuit having an output out of phase with the output of the main welding circuit and connected in parallel with the main welding circuit across the welding arc. In a preferred form of the invention the keep-alive circuit is a relatively low current circuit having a relatively high open circuit voltage. The main welding circuit and the auxiliary keep-alive circuit are energized from the same single phase alternating current supply line.

Figure 1:
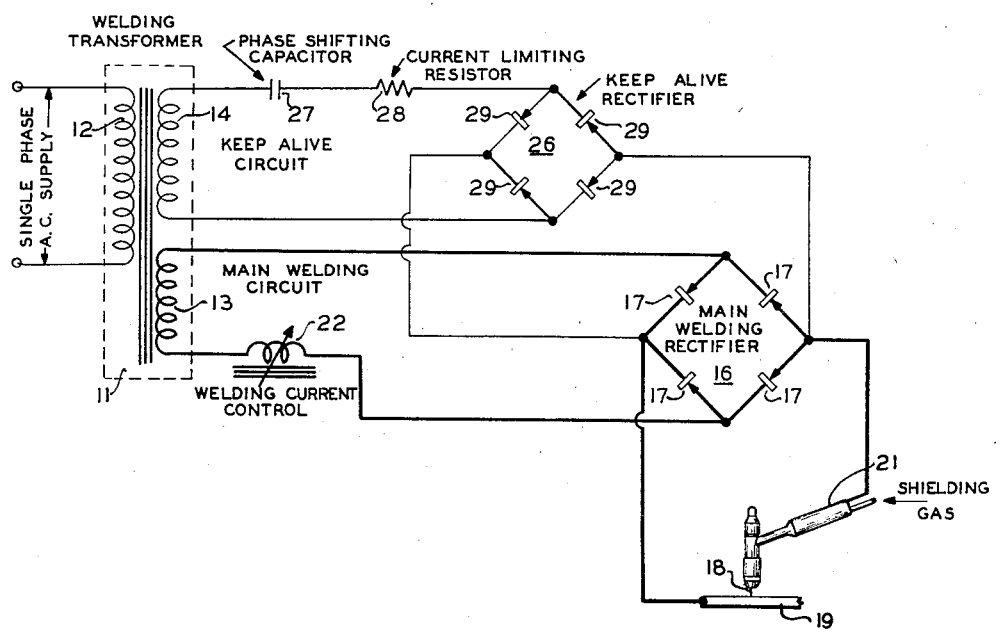
Figure 1 is a schematic diagram of a welding machine according to the present invention connected in a welding circuit.

A preferred form of the invention is schematically illustrated in Figure 1. In this drawing, the welding transformer is designated by the reference number 11, and includes a primary winding 12, a main secondary winding 13, and an auxiliary secondary winding 14. Primary winding 12 may be energized from an alternating current supply such as 115 or 230 volt single phase source of supply conventionally found in homes and shops. The turns ratio between the primary winding 12 and the main secondary winding 13 is such as to step the voltage down from the selected primary voltage, such as 115 volts, to a relatively low voltage usually of the order of magnitude of 50 volts. The output of this secondary winding is applied across a full wave bridge type rectifier circuit 16, preferably made up of selenium rectifiers 17 or other dry disc type rectifier elements. The output of the rectifier, which is pulsating D. C., is applied between the welding electrode 18 and a workpiece 19. While this invention is not limited in any respect to the type of welding electrode employed, this invention is particularly well adapted for use with inert gas shielded tungsten electrode welding where the electrode 18 is held in an electrode holder 21 through which the welding current passes to the electrode. Shielding gas supplied to the electrode holder is delivered therefrom in a manner to surround the electrode, the arc, and weld puddle formed thereby with a flowing stream of shielding gas to determine the electrical characteristics of the arc, and to exclude the ambient air from the electrode, the arc, and the weld puddle. Some form of current control such as a variable inductance 22 is preferably employed in the circuit of the main transformer secondary winding 13. In a preferred form of the invention two selenium rectifier discs are employed in series in each leg of the rectifier circuit 16, for operation with the 50 volt open circuit voltage of the secondary winding 13. These rectifiers are so selected as to pass a welding current of the order of 50 amperes without overheating. Obviously two or more rectifier stacks may be used in parallel in each leg of the bridge circuit if necessary to satisfy the current requirements.

Another full wave rectifier circuit 26 is connected across the output of the auxiliary secondary winding 14. This auxiliary winding 14 has a turns ratio with the primary winding 12 such that the open circuit output voltage of the secondary winding is relatively high, usually of the order of 80 volts. A phase shifting capacitor 27 having a capacitance of the order of 250–500 microfarads and a current limiting resistor 28 are inserted in circuit with the auxiliary secondary winding 14 and the rectifier circuit 26. The rectifier circuit 26 is again preferably of the dry plate type connected in a bridge circuit with its output connected across the welding arc in parallel with the output of the main welding rectifier circuit 16. The rectifier elements 29 in the auxiliary rectifier circuit are also preferably of the selenium type, and are used in stacks in the conventional manner. At least a three plate stack is required to accommodate the 80 volt open circuit voltage applied to the auxiliary circuit. The output of this auxiliary circuit is pulsating direct current which is out of phase with the output of the main welding circuit. The net phase differential between the outputs of the auxiliary circuit and the main welding circuit in the particular circuit illustrated is the result of the combined phase shifting effects of the capacitance in the auxiliary circuit and the inductance in the main welding circuit. There is obviously considerable permissible latitude in the design of these circuits to produce the required phase differential. While it is the objective to make this phase difference approach 90° it has been determined that phase differences of only 15° will frequently work satisfactorily. In the auxiliary circuit illustrated the capacitor 27 and resistor 28 are so selected as to effect a phase differential of approximately 90° with respect to the output of the main welding circuit and to limit the current output of this circuit to a current of the order of 5 amperes. This auxiliary circuit acts to maintain the arc gap conductive when the main welding current falls to zero on each half cycle, and for this reason the auxiliary circuit is referred to as the "keep-alive" circuit. The minimum permissible phase displacement between the outputs of the main and auxiliary rectifier circuits may be defined as that which will provide a voltage across the arc gap at all times that is great enough to maintain the arc. This step of creating out of phase components from single phase alternating current may be referred to as phase splitting and the individual components as split phases.

Figure 2:
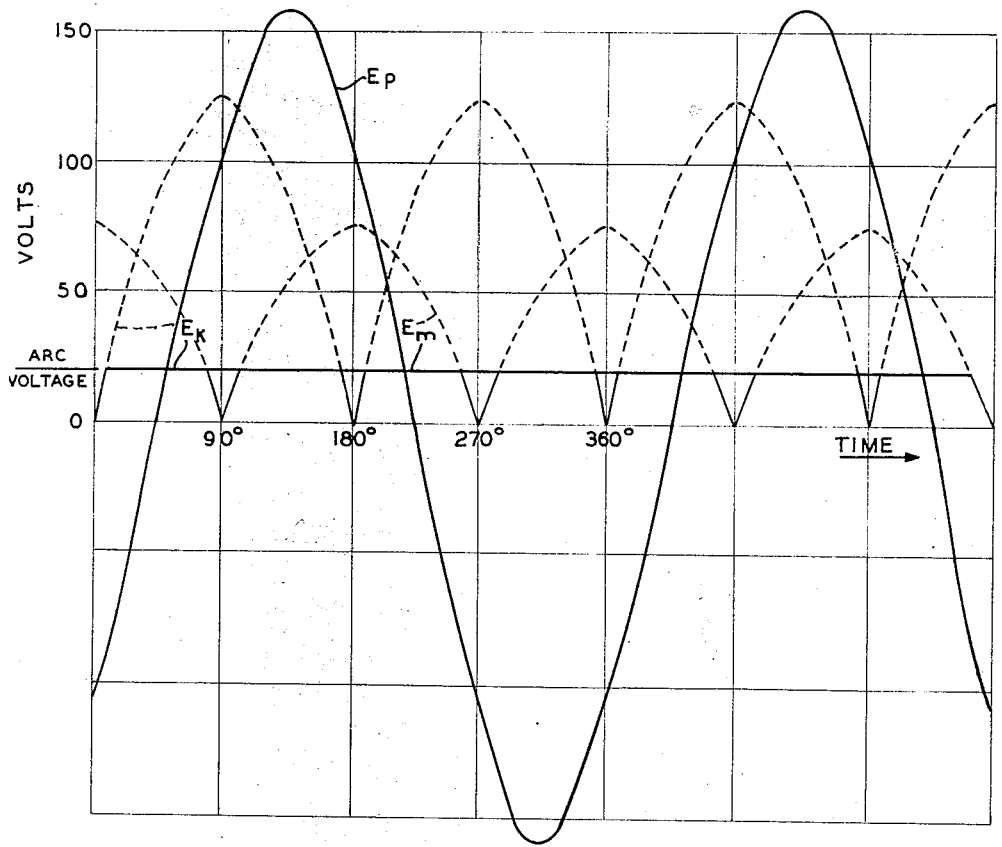
Figure 2 is a plot of voltage against time in the circuit of Figure 1.

The voltage and current relationships in the circuit described above are represented by Figs. 2 and 3 respectively. Referring to Figure 2, $E_p$ represents the voltage wave form applied to the primary winding 12 of the welding transformer 11. In most instances, this voltage will have a frequency of alternation of 60 cycles per second. Expressed in terms independent of the frequency one cycle may be represented as 360° of rotation of the wave generating element. The output voltage of the main welding circuit as it would appear if isolated, is represented in Figure 2 by the curve $E_m$. The portion of this curve shown in solid line is the actual voltage output from the main welding rectifier 16 during welding. The flat portion at the top of the curve is the arc voltage above which rectifier output cannot rise when the arc gap is conductive. The broken line represents an extrapolation of the curve $E_m$ to full open circuit voltage. Similarly $E_k$ represents the output voltage of the keep alive circuit as it might appear if isolated. Here again the maximum voltage is limited to arc voltage when the arc gap is conductive. The broken line represents an extrapolation of the curve $E_k$ to full open circuit voltage. The keep alive voltage $E_k$ leads the main welding voltage $E_m$ by approximately 90° as a result of the cumulative effect of the inductive lag in the main welding circuit and the capacitive lead in the auxiliary circuit shifting these curves in opposite directions from a theoretical secondary voltage curve 180° out of phase with the primary.

Figure 3:
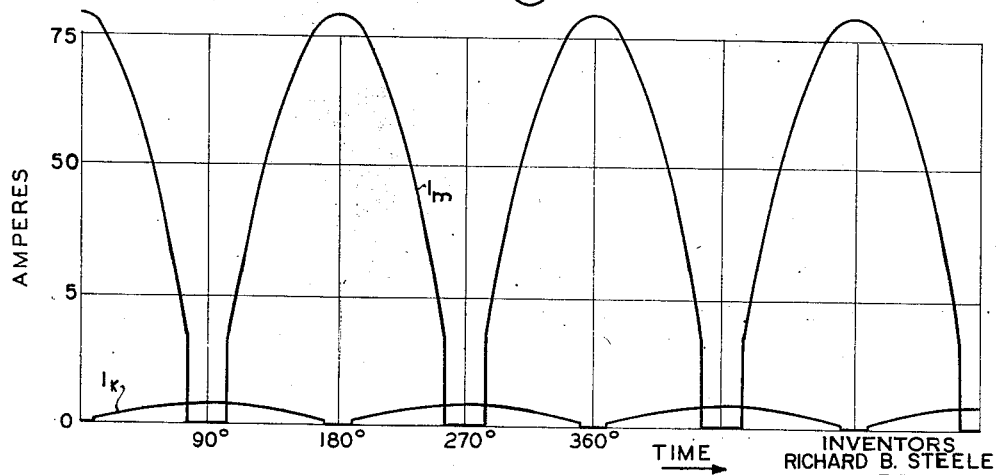
Figure 3 is a plot of current against time in the circuit of Figure 1.

Figure 3 which illustrates current relationships in the circuit is plotted on the same time base as Figure 2. It will be apparent from inspection of these figures that the main welding current depicted by curve $I_m$ is substantially in phase with the main welding voltage $E_m$ and the keep alive current $I_k$ is substantially in phase with the keep alive voltage $E_k$. Practically all the arc current is derived from the main welding current. The keep alive current $I_k$ has a very low peak value and is selected to be little more than the bare minimum required to maintain the arc gap conductive during the periods the main welding current falls to zero. The current supplied by each of the rectifier circuits fall to zero when the voltage of that circuit falls below the arc voltage. The unidirectional effect of the rectifier circuits prevents one from feeding back through the other when the voltage of one exceeds the other.

The above described circuit produces a stable welding arc giving good weld results. For all practical purposes its stability is the same as if both rectifier circuits had the same open circuit voltage as the higher voltage circuit. This welder has many advantages over conventional D. C. welders including the advantage of reduced manufacturing costs. The cost of rectifiers of any type depends on their current carrying capacity, the cost rising sharply at the high current levels. In the case of dry disc rectifiers, such as selenium rectifiers, the maximum inverse voltage that can be applied to them depends on the material, and is independent of the current capacity. For example, selenium rectifiers of the type commercially available are rated at 26 volts per plate, regardless of the current capacity of the particular plate. It has been found that in the present invention the main welding circuit can be operated with an open circuit voltage of the order of 50 volts. This means that stacks of only two plates each may be used in the rectifier unit of the main welding circuit.

According to the present invention, the high voltage circuit is the keep-alive circuit which carries a very low current. While a three or four plate stack is required in this circuit its cost is very small because of the fact that the current carrying capacity of these plates can be low.

A further factor affecting the cost of producing and operating a welding machine according to the present invention is derived from the fact that if additional phase shifting is required in addition to that inherently in the main and auxiliary circuits this can be provided by a reactive impedance in either circuit. This would usually be in the low current circuit to effect a saving in the cost of equipment. In addition by shifting the phase of both circuits in opposite directions, as in the foregoing example, the power factor may be made to approach unity.

Another advantage of the circuit described above is that it is capable of producing a stable direct current welding arc from a single phase alternating current supply. With this circuit a welder of great usefulness may be made that can be operated from commercial single phase service lines such as are normally found in the home or farm or small shop, on primary currents not exceeding the capacity of normal household and shop wiring systems, i. e. a welder capable of operating on single phase currents of the order of 30 amperes. With the circuit described herein the primary current in the welding transformer is minimum for the welding current output. This result is derived from the fact that the main welding current circuit is a low voltage circuit and therefore the step-down turns ratio of the welding transformer may be relatively large. The greater this ratio, the smaller the primary current required to produce a given welding current. The keep-alive circuit, which has an open circuit voltage higher than the main welding circuit, carries only a very small current which in itself creates no problem and adds little to the total primary current requirements. With a welding machine of the type contemplated by the present invention, a 30 ampere primary current derived from a 115 volt single phase line can produce a welding arc of about 50 amperes when employing a low amperage keep-alive circuit having an open circuit voltage of the order of 80 volts. Similarly without exceeding the usual 30 ampere limit a welding arc of the order of 100 amperes can be satisfactorily obtained when operated from a 230 volt line.

Another advantage of the circuit is the reduced heating problems and power losses associated therewith, as compared to the conventional rectifier welders. Heat is generated and power lost in the passage of welding current through the rectifier elements. By reducing to a minimum the number of rectifier plates per stack in the main welding circuit, the power loss due to heating is minimized. There is very little heat generated by the passage of the low keep-alive current through its rectifier elements. In addition to the saving in power loss through heating, there is a further saving of power and expense in that when the heating losses are minimized the power requirements of a blower or the like to remove that heat are proportionately decreased.

Figure 4:
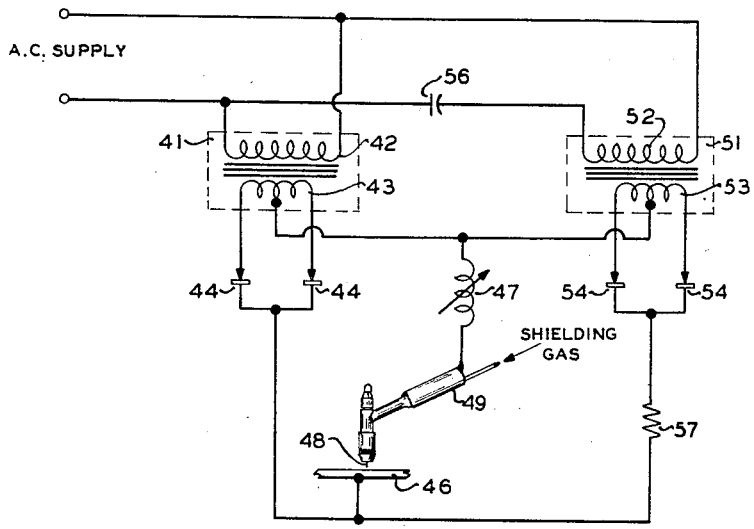
Figure 4 is a schematic diagram of a modified form of the invention.

Obviously there are many variations and modifications which may be made while still employing the concepts of the present invention. One such modified circuit is illustrated by the schematic diagram of Figure 4. In this device two transformers are employed instead of the single transformer of Figure 1 which has two secondary windings. The phase shifting component for the keep-alive circuit is located in the primary circuit rather than in the secondary circuit. The rectifier circuits are single phase full wave rectifier circuits as opposed to the bridge type rectifiers employed in the circuit of Figure 1. Referring to Figure 4, the main welding circuit consists of the main welding transformer 41 having a primary winding 42 and a secondary winding 43. Rectifiers 44 are connected to each terminal of the secondary winding 43 and to the workpiece 46. A conductor from a center tap in the secondary winding 43 completes the circuit through a current control such as variable inductance 47 to the welding electrode 48 held in electrode holder 49. This full wave rectifier circuit constitutes the main welding circuit and is made with circuit components giving it a relatively low open circuit voltage. The keep alive circuit is powered by the keep alive transformer 51 having a primary winding 52 and a secondary winding 53. A similar rectifier circuit including rectifier elements 54 is connected in parallel with the main welding circuit across the welding arc gap formed between welding electrode 48 and the workpiece 46. A capacitor 56 in the primary circuit of the keep-alive power transformer 51 acts to shift the phase of the keep-alive rectifier output circuit so that the keep-alive voltage pulses derived from the keep-alive full wave rectifier circuit are substantially 90° out of phase with the corresponding voltage pulses from the main welding circuit. Resistor 57 acts to limit the current in the keep-alive circuit. It may be seen that while this modified circuit varies in many respects from that described above, it retains all the benefits and advantages stated for the form of the invention depicted in Figure 1.

Obviously a welding current source of the type contemplated herein is useful in all kinds of direct current arc welding regardless of whether the welding arc is drawn between an electrode and a workpiece or between two electrodes.

While only two specific embodiments of the invention have been shown and described herein in detail, it is to be understood that the invention is not limited to the particular forms shown but may be used in other ways without departure from its object as defined by the following claims.

1. Direct current eelctric arc welding apparatus comprising a first transformer secondary winding and a second transformer secondary winding, said first and second transformer secondary windings being in magnetic circuits energized from the same single phase alternating current source and said first secondary winding having a higher open circuit voltage than said second secondary winding, a first full wave rectifier connected to rectify the output of said first secondary winding and apply the same to an electrode and a workpiece, a second full wave rectifier connected to rectify the output of said second secondary winding and apply the same to said electrode and said workpiece in parallel with the output of said first rectifier, current limiting means in the higher voltage rectifier circuit to limit the arc current derived therefrom to a minor proportion of the total arc current, and means for causing the output of the two rectifiers to be out of phase by an amount which will provide a voltage between said electrode and said workpiece at all times great enough to maintain the arc.

2. Electric arc welding apparatus comprising a main full wave rectifier circuit and an auxiliary full wave rectifier circuit, means connecting the outputs of said rectifier circuits in parallel and with the same polarity across a welding arc gap formed between an electrode and a workpiece, a welding transformer having a primary winding, a main secondary winding, and an auxiliary secondary winding of higher open circuit voltage than said main secondary winding, means for energizing said primary winding from a source of single phase alternating current, means connecting said main secondary winding to the input of said main rectifier circuit whereby the output of said main secondary winding is rectified to produce a main pulsating direct current across said arc gap, means in the circuit of said main secondary winding to control the value of the current flowing therein, means connecting said auxiliary secondary winding to the input of said auxiliary rectifier circuit whereby the output of said auxiliary secondary winding is rectified to produce an auxiliary pulsating direct current of higher open circuit voltage than said main pulsating direct current across said arc gap, means in the circuit of said auxiliary secondary winding to limit the value of the current flowing therein to a value substantially below the value of the current in the main secondary winding, and means in the circuit of said auxiliary secondary winding to shift the phase of the output of the auxiliary rectifier with respect to the output of the main rectifier.

3. Apparatus according to claim 2 in which the main full wave rectifier circuit and the auxiliary full wave rectifier circuit are bridge type rectifier circuits.

4. Apparatus according to claim 3 in which the rectifier elements in the respective rectifier circuits are dry disc rectifiers.

5. Apparatus according to claim 4 in which the rectifier elements in the respective rectifier circuits are selenium rectifiers.

6. Apparatus according to claim 5 in which each leg of the main rectifier bridge circuit contains a two plate stack of selenium rectifier elements and each leg of the auxiliary rectifier bridge circuit contains a stack of more than two selenium rectifier elements.

7. Apparatus according to claim 2 in which the phase shifting means in the circuit of the auxiliary secondary winding is a capacitor.

8. Direct current electric arc welding apparatus comprising means for generating a first pulsating direct current by full wave rectification of a single phase alternating current, means for applying said first pulsating direct current to an electrode and a workpiece to form a welding arc therebetween, means for generating a second pulsating direct current by full wave rectification of a single phase alternating current, said second pulsating direct current being displaced in phase with respect to said first pulsating direct current and having a higher open circuit voltage than said first pulsating direct current, means for applying said second pulsating direct current to said electrode and said workpiece to supplement said first pulsating direct current forming said arc, and means for limiting the current supplied to said arc by said second pulsating direct current to a minor part of the total arc current.

9. Direct current electric arc welding apparatus comprising means for generating a first pulsating direct current by full wave rectification of a first single phase alternating current, means for applying said first pulsating direct current to an electrode and a workpiece to form a welding arc therebetween, means for generating a second pulsating direct current of higher open circuit voltage than said first pulsating direct current by full wave rectification of a second single phase alternating current which is out of phase with said first single phase alternating current and derived from the same single phase source as said first single phase alternating current, means for applying said second pulsating direct current to said electrode and said workpiece to supplement said first pulsating direct current forming said arc, and means for limiting the current supplied to said arc by said second pulsating direct current to a minor part of the total arc current.

No references cited.